US011408083B2

(12) United States Patent
Riveros Urzua et al.

(10) Patent No.: US 11,408,083 B2
(45) Date of Patent: Aug. 9, 2022

(54) FILTER PRESS DEVICE FOR ELECTRODEPOSITION OF METAL FROM SOLUTIONS, WHICH IS MADE UP OF SEPARATING ELEMENTS CONFORMED BY ION EXCHANGE MEMBRANES FORMING A PLURALITY OF ANOLYTE AND CATHOLYTE CHAMBERS, WHEREIN THE ELECTRODES ARE CONNECTED IN SERIES WITH AUTOMATIC DETACHMENT OF THE METAL PRODUCT

(71) Applicant: TRANSDUCTO S.A., Santiago (CL)

(72) Inventors: Gabriel Angel Riveros Urzua, Santiago (CL); Magdalena Cifuentes Cabezas, Santiago (CL)

(73) Assignee: TRANSDUCTO S.A., Santiago (CL)

( * ) Notice: Subject to any disclaimer, the term of this patent is extended or adjusted under 35 U.S.C. 154(b) by 259 days.

(21) Appl. No.: 15/767,912

(22) PCT Filed: Oct. 13, 2016

(86) PCT No.: PCT/CL2016/000059
§ 371 (c)(1),
(2) Date: Apr. 12, 2018

(87) PCT Pub. No.: WO2017/063097
PCT Pub. Date: Apr. 20, 2017

(65) Prior Publication Data
US 2018/0298504 A1      Oct. 18, 2018

(30) Foreign Application Priority Data
Oct. 13, 2015   (CL) .................................. 3030-2015

(51) Int. Cl.
*C25B 9/00* (2021.01)
*C25B 9/73* (2021.01)
(Continued)

(52) U.S. Cl.
CPC ............ *C25B 9/73* (2021.01); *C02F 1/46109* (2013.01); *C25B 9/23* (2021.01); *C25C 1/00* (2013.01);
(Continued)

(58) Field of Classification Search
CPC .... C25B 9/18; C25B 9/08; C25B 1/12; C25B 15/00; C25B 9/06; C25B 13/00; C25B 1/46; C25B 9/16
See application file for complete search history.

(56) References Cited

U.S. PATENT DOCUMENTS 4,019,968 A *  4/1977  Spaziante ............... C25C 7/002
                                                    205/144
2007/0144898 A1    6/2007  Oldani et al.
2009/0301871 A1* 12/2009  Zappi ..................... C25B 15/00
                                                    204/283

FOREIGN PATENT DOCUMENTS

AU          24113/71        7/1972
CA          2662228 A1     12/2009
(Continued)

*Primary Examiner* — Zulmariam Mendez
(74) *Attorney, Agent, or Firm* — Muncy, Geissler, Olds & Lowe, P.C.

(57) ABSTRACT

A filter press device for electrolytic production of metal for electrodeposition of metal from solutions, constructed from a plurality of cells connected electrically and hydraulically in series. Each has alternating frames and ion-exchange membranes to form alternating anode and cathode compartments, allowing the free path of liquid. Anolyte or catholyte passes through each compartment. The electrolyzed product is discharged from the compartment in the form of metal or a metallic compound. The electrodes are designed with a vertical base plate acting as an anode with the respective anolyte in a cell unit and in the other, acting as a cathode with the respective catholyte in the adjacent cell unit. Completed the production cycle, the device is stopped, the
(Continued)

cell is opened, allowing the metal deposition electrodes, cathodes, can be removed and replaced to start a new productive cycle or remain in place with automatic detachment of metal product.

15 Claims, 4 Drawing Sheets (51) Int. Cl.
*C25C 1/12* (2006.01)
*C25C 7/02* (2006.01)
*C25C 7/04* (2006.01)
*C25C 7/08* (2006.01)
*C25C 7/00* (2006.01)
*C25C 7/06* (2006.01)
*C25C 1/00* (2006.01)
*C25B 9/23* (2021.01)
*C02F 1/461* (2006.01)

(52) U.S. Cl.
CPC ............. *C25C 1/12* (2013.01); *C25C 7/00* (2013.01); *C25C 7/002* (2013.01); *C25C 7/02* (2013.01); *C25C 7/04* (2013.01); *C25C 7/06* (2013.01); *C25C 7/08* (2013.01)

(56) References Cited

FOREIGN PATENT DOCUMENTS

| GB | 1497542 A | 1/1978 |
| JP | S 60-125386 A | 7/1985 |
| WO | WO 2010/002235 A2 | 1/2010 |

* cited by examiner

FILTER PRESS DEVICE FOR ELECTRODEPOSITION OF METAL FROM SOLUTIONS, WHICH IS MADE UP OF SEPARATING ELEMENTS CONFORMED BY ION EXCHANGE MEMBRANES FORMING A PLURALITY OF ANOLYTE AND CATHOLYTE CHAMBERS, WHEREIN THE ELECTRODES ARE CONNECTED IN SERIES WITH AUTOMATIC DETACHMENT OF THE METAL PRODUCT

BACKGROUND OF THE INVENTION

Brief Discussion of the Related Art

The methods and devices for the extraction of metals from minerals are known in a broad spectrum and the technical literature makes a display of such techniques.

In general, the final process of this series is electrorefining, for the case in which the copper electrolyte comes from impure copper anodes or recycled scrap metal; or electrowinning (hereinafter also referred to as EW) if the copper comes from copper oxide or sulfate dissolved in a concentrated solution of sulfuric acid or another acidic or basic medium. In the first case, for electrorefining, the electrolyte comes from copper sulfides, while in the second, electrowinning, it comes from solvent extraction (hereinafter also referred to as SX). In both cases, the dissolved copper, by means of the application of electrical current, is deposited on a surface to form high-purity cathodes. The tank in which this process takes place is commonly referred to as an electrowinning or electrorefining cell, or also the electrolytic tank, which dates back to the last century.

The latter process is well established in the industry, and the electrolyte, for example, coming from solvent extraction (SX) is made up of sulfate and sulfuric acid, in concentrations of 40-45 g/l Cu and 180-200 g/l of acid, and impurities Fe (<1 g/l), Mn and Cl. As additives to improve cathode quality, cobalt sulfate and Guar gum are added.

One of the problems that electrodeposition presents is the formation of acid mist ($O_2$+$H_2SO_4$), and to maintain the quality of the product with an acceptable cathodic deposit, there is a critical current density that is maintained between 250-360 A/m$^2$. Outside this range, the cathodes may be less dense, shiny, and in general, commercially unacceptable. The technical literature also indicates that there is large associated energy consumption, on the order of 3 kWh/kg Cu, due to the anode reaction, and that this is associated with the fact that half reaction cathodic deposition involves a two-electron process, namely the bivalent copper discharges to metallic copper. It is not possible to operate in an atmosphere of sulfuric acid with monovalent copper, because the cuprous ion has greater reduction potential than the cupric ion, which is an indication of the natural tendency of the cuprous ion to dismute into cupric ion and metallic copper.

The most economic route adopted in industry, to avoid the production of copper from copper sulfates, is to have an electrolytic bath operating in a hydrochloric environment with an excess of chloride ions, which exercises a complexing action, shifting the balance of the disproportion reaction in an elegant way. Therefore, the mineral can be attacked with copper chloride and sodium chloride, making it possible to maximize the content of monovalent copper. The typical solution obtained with 5-75 g/I $Cu^+$ along with 60-300 g/l of NaCl and 1 M of hydrochloric acid and pH not greater than 2 can be subjected to the electrowinning process. This method reduces energy consumption, but the quality of the cathodes is not similar to the quality obtained with copper sulfate, since, even operating with current densities not greater than 1 kA/m$^2$, there are problems with adherence and shininess of the cathodes. To this end, the U.S. Pat. No. 7,658,833 B2, by Robinson et al., dated February 2010, resolves the problem by modifying the cathode deposition by means of a semi-permeable diaphragm that allows the controlled circulation of the electrolyte from the anode to the cathode in the electrolytic tanks.

The chloride technology was used at the industrial level in Australia, but corrosion in the plant was excessive, causing production to be halted. Consequently, today there is no technology implemented for cuprous ions.

On the other hand, in any electrolytic system to obtain metal deposits of acceptable quality, and especially, if it is to obtain commercial cathodes, as is the case in most of the electrowinning and electrorefining processes, this is constituted by the current density, which is directly related to the surface area of the electrodes, and therefore, the size of the electrolytic cell and its cost. Any development that is used to increase the current density limit without significantly adding to its cost, is therefore highly valued. Therefore, to reduce the increase in the thickness of the film adjacent to the cathode which decreases the diffusion rate and prevents the aforementioned objective, an increase in the agitation of the electrolyte is required. In this regard, there are numerous patents that suggest different mechanisms.

The U.S. Pat. No. 4,053,377 develops an electrodeposition cell where a uniform flow of solution is maintained through the electrodes with current densities in the range of 645 to 4300 A/m$^2$. Specifically, the electrolyte is introduced into the cell by means of a centrifuge pump, passing through a series of gates that have an increasing number of openings inside a Venturi. The electrolyte flows inside the large cells at an average speed of 23 m/min.

Another solution, given the commercial impracticality due to the inefficiency of pumping through external pipes, is the one proposed in U.S. Pat. No. 4,139,429, which proposes a new type of cell that, includes the parallel introduction of the electrolyte at a moderate and uniform speed, passing over the entire surface of the electrodes, while minimizing energy loss in moving the electrolyte. The speed of the electrolyte per unit of input energy is also maximized and a new cell design is proposed, adapted to contain two lateral walls, two arched walls, and a bottom. Adjacent to each arched wall is an agitator positioned in the center (in the bottom), which rotates and generates a recirculation flow of the electrolyte in the cell. The current density used in this process is at least 430 A/m$^2$.

The U.S. Pat. No. 5,855,756 dated 1999, discloses another method and design of an electrorefining cell that increases electrolyte flow rates while maintaining the layer of clay on the bottom of the cell and keeping the surface of the anode substantially intact. The cell includes a collector located close to the bottom of the cell and has multiple discharge openings for the electrolytic solution. As similar configuration is used to discharge the electrolyte, which allows a relatively high flow in and out of the cell.

These examples illustrate the attempts to improve the operation of the electrolytic tank without achieving their objectives.

A different cell concept from the conventional cell and that considers the induction of a turbulent flow of fluid with high current densities above 1 kA/m$^2$, is the EMEW (ElectroMetals ElectroWinning) cell that is described in U.S. Pat. No. 5,529,672 de Barr et al., Jun. 25, 1996. This cell can work with electrolyte concentrations for the case of copper between 5-45 g/l, at the same time tolerating high levels of contaminants such as chloride (>10 g/l), ferric iron (15 g/l), among others; with its characteristics including the ability to operate without the SX stage provided that the quality of the PLS is acceptable in terms of impurity content. It is also possible to use it to electrolytically extract other metals such as Zn, Ni, and Ag. The cell is conformed by two cylindrical electrodes, an anode made of a titanium-based alloy and an exterior cathode made of stainless steel. The cell chamber is closed so there are no acid mist emissions, with a tangential feed of electrolyte at a high flow rate, able to operate with high current densities, above 1 $kA/m^2$ to obtain grade A cathodes. Although this type of cell is very different from conventional cells, it makes it possible to achieve higher current densities with high current efficiency, so that in terms of energy, its effect is not significant, producing at the same time cathodes that would not be easily acceptable on the market.

In conventional EW cells, the reaction that occurs on the anode is the electrolytic decomposition of water, which does not affect the efficiency in the use of current because it does not generate cations that could reduce the cathode. However, the use of this anode reaction requires high cell voltage, resulting in high energy consumption, in addition to the generation of acid mist in electrowinning buildings.

The use of the oxidation of $Fe^{2+}$ to $Fe^{3+}$ as an anode reaction in copper EW has also been studied. However, the use of this anode reaction in conventional EW involves a reduction in cathode current efficiency, because part of the current is consumed in the reduction of the $Fe^{3+}$ ions that are near the cathode. For this reason, the ion-exchange membranes are of interest in this technique, because two solutions can be separated, one with the copper ions (catholyte) and the other containing ion ions (anolyte), conserving the electrical conductivity between them by means of selective transport of species in solution and allowing the electrodeposition of copper to be carried out.

Based on the previous information, alternative cells to the conventional cells have been developed using membranes as the fluidized bed cells. The U.S. Pat. No. 7,494,592 B2, Feb. 24, 2009, describes the cell titled "Spouted Bed", a cell that ostensibly improves the hydrodynamic condition. These fluidized bed cells are made up in most designs of independent compartments for anolyte and catholyte, separated by diaphragm membranes. Said ion-exchange membranes serve as a support for the bed. The metal that forms the cathode must be the same as the metal that is to be recovered, because the initial particles become part of the final product; for this reason, in the case of copper, this cell has a bed of copper particles in the catholyte compartment, which is put into suspension by an upward flow of solution that enters the cell through a diaphragm or distributor. The copper particles are cathodically polarized by means of a current feed inserted in the bed, and the cell circuit is completed with a material anode for the oxidation reaction present in the anolyte compartment. The body of this type of cell may be rectangular or cylindrical, but in both cases, the electrolyte is fed through the bottom of the body, while the discharge of the electrolyte is by overflowing of the upper part. This type of cell is characterized by having a large cathode surface area, which allows them to have more area for copper deposition and to operate at lower current densities, which results in a reduction of cathode polarization. The fluidizing of the bed also generates a high relative velocity between the solution and the electrode, which increases the mass transfer. In the latter case, the cell body may be cylindrical or with a flat geometry.

This not withstanding, it should be noted that this type of fluidized bed cells present drawbacks such as problems with the mechanical strength of the material that supports the bed, extensive dissolution zones in the bed (due to the distribution of the potential), high pumping costs to fluidize large quantities of particles and a tendency to foul the membrane, generating a passive layer. These limitations are what have prevented this type of cell from being applied extensively at an industrial level.

Other alternative cells that use membranes are specially designed electrodialysis cells, which have alternating homopolar ion-exchange membranes between an anode and cathode and an electric field perpendicular to them. This type of cell makes it possible to separate and concentrate different ion species, so its use has been mainly in the treatment of industrial effluents, the production of substances for food manufacture, and desalination of seawater. The process of separating ion species is known as electrodialysis (hereinafter also referred to as ED) and when specific chemical reactions are also provided at the electrodes, it is called reactive electrodialysis (hereinafter also referred to as RED), a technique that has been used for copper production at the laboratory level.

An RED cell with two and three compartments concerning the use of ion-exchange membranes is described in the publication by L. Cifuentes et al, "Electrowinning of copper in two- and three-compartment reactive electrodialysis cell", Chem. Eng. Sci. 61(2006), 3623-3631; in Chilean patent No. 49958 dated Jul. 8, 2009 "Autogenic hydrometallurgic procedure for the production of metals and materials combining leaching and oxidant regeneration using electrolytic cells with membranes" by authors J. M. Casas and M. Amigo; and Chilean Utility Model No. 336 dated Sep. 9, 2014 "Electrolytic tank for electrodialysis processes" by author M. Amigo, based on the aforementioned patent. This latter publication, while it does refer to a possible design of an EW cell, is only an attempt to incorporate separation membranes into a conventional EW cell, with the sole objective of obtaining iron ions.

A better advance established in the development of an RED cell is found in patent application WO201227438 A2, by authors Simpson Araya J. R. et al., "Electrolyte cell for the winning of metals by reactive electrodialysis and electrolytic process for the winning of metals that uses said cell" dated 22 Mar. 2012. This latter publication describes an electrolytic cell for winning metals that consists of three compartments with equal dimensions, separated by ion-exchange membranes, wherein two compartments contain an anolyte solution and a positively polarized electrode plate (anode) immersed in it, while the third compartment contains a catholyte solution and a negatively polarized electrode (cathode) immersed in it. Said compartments are interlayered, physically separating both solutions with ion-exchange membranes, which allow electrical conduction between the two solutions. This type of cell, as indicated, can operate with current densities of up to 1.5 $kA/m^2$, with electrolyte flow rates of between 100 and 1000 l/min, acidity between 50 and 190 g/l of $H_2SO_4$, total iron concentration in the anolyte between 0.3 and 1 M, copper concentration in the catholyte between 3 and 15 g/l and a cell voltage between 0.5 and 2.5 volts. Even when this use is mainly aimed at copper, it can also be applied with other metals, with the principal advantages being the elimination of acid mist, lower specific energy consumption, and operation without the SX stage. The extraction of the cathodes is not indicated in the cell operation procedure.

It should be noted that none of the previous cases of RED have moved beyond the laboratory stage.

Other types of electrolytic cells are the sealed filter press cells with ion-exchange membranes that are used in the chemical industry to obtain halogen gases, such as chlorides or bromides, from an anode chamber, and an alkaline metal hydroxide from a cathode chamber by means of electrolysis of an aqueous solution of an alkaline metal halide such as sodium chloride, potassium chloride, or sodium bromide. The process called "ion-membrane exchange process" enjoys a high degree of commercial acceptance due to the quality of the products with low energy consumption. This type of electrolytic cell may have one or two poles.

In a single-pole cell, the ion exchange membrane is positioned between the anode and the cathode, and in a two-pole cell, the ion exchange membrane is positioned between each anode of a two-pole electrode and an adjacent two-pole electrode cathode. The cell structure is compact, with small spaces between electrodes and membranes, generally selected in the range of 5 to 30 mm. A bipolar cell is described in U.S. Pat. No. 4,465,579 "Bipolar electrolytic cell" by authors Mataga et al., dated Aug. 14, 1984, and a single-pole or bipolar cell in U.S. Pat. No. 4,729,822, "Electrolytic Cell", by authors James et al., dated Mar. 8, 1988. Said inventions, applied to the chemical industry of chlorine, alkalis, and generation of gases, such as hydrogen and oxygen, provide a filter press electrolytic cell that comprises a series of anode plates, cathodes, and packing made of an electrically insulating material, and an ion exchange membrane positioned between each anode and cathode, forming anode and cathode compartments, in general very thin, wherein each one contains longitudinal openings that act as headers through which the anode and cathode compartments can be loaded separately, and openings for the discharge of the products of the electrolysis from the anode and cathode compartments.

The application of this type of patent in extractive metallurgy, and specifically in the electrodeposition of metals, is not known.

Considering the above information, it can be observed that in the patents referenced in the state of the art of EW, there is a tendency to mitigate and/or resolve the matter of acid mist generation and gas emissions by means of closed cells and increasing the current density. However, some of them have not moved beyond the laboratory or test-bench stage, while others do not present a commercial product accepted on the market. On the other hand, the chemical industry presents a series of electrochemical cells that use ion-exchange membranes, as is the case of electrodialysis (ED) cells, whose transfer to the metallurgy industry requires a cathode deposit, and of reactive electrodialysis (RED) cells, which have not moved beyond the laboratory stage and much less come close to producing standard cathodes.

Likewise, the existing technology, as it is conceived by hydrodynamic conditions, cannot operate with high electrolyte flow rates, or low concentrations of PLS solutions, which involves working in a limited range of current density, high temperature and metal concentration in the solution to produce cathode quality copper, requiring the SX operation and enormous quantities of chemical reactants, resulting in the gigantic size of this type of plant.

The present patent resolves the aforementioned problems with a new design of a filter press electrowinning device based on the use of ion-exchange membranes that may be applied in the winning of a large variety of metals dissolved in solutions of different origins or oriented towards the production of compounds or materials required by the metallurgy industry. This electrowinning device replaces the solvent extraction (SX) and electrowinning (EW) stages that follow the leaching of minerals.

SUMMARY OF THE INVENTION

The present patent discloses a new filter press device for the electrowinning of metals or compounds wherein the device itself is made up of catholyte or anolyte chamber units that operate independently, at uniform and high flow rates.

Each one of the chambers has anodes and cathodes with variable surface areas, which may be designed according to industrial requirements, of 0.25, 0.50, 1 $m^2$ or larger. Likewise, each chamber is made up of separating ion-exchange membranes, to form alternating compartments through which the anolyte and catholyte circulate.

The chambers are connected in series electrically and hydraulically

The metal deposition process is carried out by means of electrical energy, applied to the electrodes of the device, using a current rectifier, allowing the metal to be deposited. Therefore, one of the objectives of the present invention is to provide a construction of a simplified device for the electrolytic production of metal, of the type that comprises electrodes connected in series, a construction that is specially designed for electrolyte circulation, corrosion resistance at high temperatures, accessibility for repairs, and maintenance and harvesting of the metal.

The device of the invention consists of chambers such that the construction for industrial production will be made up of a plurality of electrodeposition devices connected in series electrically, wherein the electrodes, except the terminal electrodes, are equipped with a vertical plate base separated by a rubber piece. One side acts as an anode in a cell unit, while the other side acts as a cathode in the adjacent chamber unit.

The electrode plates are inserted between them, with electrical contact on the rubber, forming a package of chambers with their respective electrodes. The exterior sides of the terminal electrodes are equipped with electrical connections to make up the electrolytic device. With this arrangement, a high current density can be applied to each device and at the same time a high vertical flow of electrolyte can be passed through. The chambers are separated by ion-exchange membranes, so anolyte will circulate through the anode chamber and catholyte through the cathode chamber. Said membrane allows electrical conduction between the two solutions.

According to the invention, the electrolytic device is a filter press device because each electrolytic device formed comprises alternating frames, ion-exchange membranes, and electrodes, to form alternating anode and cathode compartments, consequently, through the attachment of these, a completely enclosed and sealed device is formed. Each frame of the chamber that makes up the assembly, comprises empty spaces for the flow of liquid and gas, in that each frame has an inlet and outlet on its exterior surface and holes on its interior surface, through which each type of electrolyte passes to an anolyte or catholyte compartment formed in the rack and the electrolyzed product is discharged from the anolyte or catholyte compartment, following the aforementioned in series hydraulic configuration.

Another object of the present invention is to provide a filter press device for electrowinning that maintains the uniform distribution of the liquid inside the chambers that is ensured under high pressure conditions to completely prevent the liquid from leaking in the chambers and that is easily assembled or disassembled.

Under the arrangement described above, a uniform flow of anolyte or catholyte electrolyte circulates through each chamber from the lower openings to the upper openings, where the electrodes are polarized positively (+) or negatively (−) by the effect of the electric field that is applied, with electrodeposition occurring on the cathode. Said flow is essentially stable during circulation, free of interference, simultaneously providing sufficient residence time for the occurrence of the chemical reactions and the electrodeposition of metal. The dimensions and positions of the openings generate low resistance for the flow, so the volume is stable, which leads to an operation that is easily controlled with minimal variation of the operational parameters. The thickness of the metal deposited on the cathode plate, although it decreases the circulating volume of catholyte, does not affect the quality of the catholyte or the operation of the cell due to the hydrodynamic design condition of the cell.

According to the preferred installation of the electrowinning device, the anolyte and catholyte electrolyte circulation openings are connected internally with seals that prevent leaks, but at the same time facilitate the renewal and repair of the assemblies. In turn, the metal deposition electrodes—cathodes—may be lifted out of the electrolytic device, removed from the place for detachment of metal, and be replaced. Likewise, the device has a mechanism for the automatic detachment of the cathodes, which are collected in the lower part of the device. The frames of the chambers are made of a strong plastic material resistant to acid corrosion, while the metal electrode plates are made of stainless steel, lead, or another required material depending on whether they are cathodes or anodes, respectively. These types of metal are also conditioned by the type of mineral dissolved in the solution that is to be deposited and extracted from the solution. Said solution may be acidic, basic, or neutral in nature.

The present invention has the following advantages compared with the other metal electrodeposition devices and methods:

1. The operation of metal electrodeposition is carried out with PLS directly from the leaching operation, avoiding the need for the solvent extraction (SX) process, allowing the previous leaching stage to work with acidic, basic, or neutral solutions. In addition to the aspects mentioned above, it is possible to operate with solutions from SX or other solutions with similar characteristics.

2. Under the previous condition, the metal obtained is of higher quality than the metal obtained directly through the traditional process, without requiring the addition of chemical reactants, improving overall extraction and the kinetics of the process.

3. It is possible to operate with higher current densities that in the conventional process (>400 A/m$^2$) which results in a larger metal deposit per effective area in a shorter process time. This, a product of the cell hydrodynamic conditions allows working with high electrolyte flow rates.

4. It is environmentally friendly, because the electrodeposition is carried out in a completely closed and sealed electrolytic device, without the emission of contaminant gases or acid mist that is discharged to the atmosphere, of the spilling of liquids, a conditions that considerably improves the work area, the surrounding wildlife, and does not pollute in any way.

5. It involves less specific energy consumption to achieve the same current density.

6. It makes it possible to generate $Fe^{+3}$, a reactant that is essential for the leaching of minerals and stabilization of impurities such as $As^{+5}$ to the form of $FeAsO_4$.

7. The obtaining of metal in the electrowinning device is at ambient temperature, or within the range of 10-60° C., requiring no energy consumption to preheat the electrolyte.

8. It makes it possible to recover either sulfuric acid ($H_2SO_4$) or other acids or bases that have dissolved the metals during the leaching of minerals, powders, or others present in mining processes, as reactants, resulting in an economy of processing that requires less reactants during operation.

9. The occupational safety conditions improve as a result of operations that do not expose operators to the contact, handling, or inhalation of hazardous and corrosive acids or bases.

10. It is an economically viable alternative for electrodeposition of metals, mainly copper, gold, silver, and other metals, avoiding the current process which is based on solvent extraction (SX), with organic additives and other chemical reactants, some of which are even carcinogenic.

11. It can operate electrically in intensiostatic (current conventional operating mode in the EW of copper) or potentiostatic mode as required.

12. It is possible to immediately remove the metal from the cathode surface if the surface is not as rough in comparison with the standard process, not requiring a later associated detachment stage.

DETAILED DESCRIPTION OF THE PREFERRED EMBODIMENTS

Figure 1:
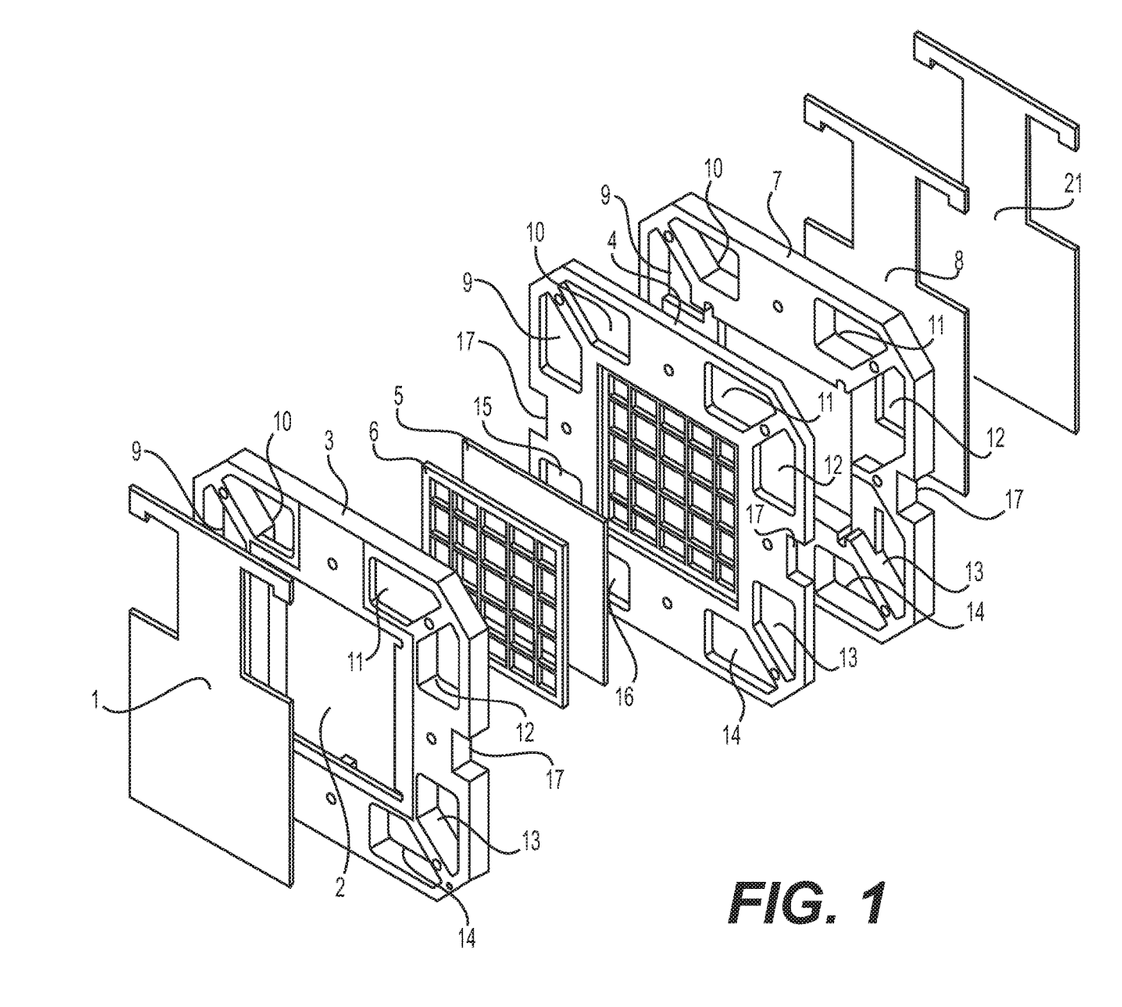
FIG. 1 is a schematic exploded view that shows an arrangement of the chamber frames, the electrodes between the chamber frames, the ion exchange membrane, the membrane support, and the transfer openings for the electrolyte and liquor in a filter press apparatus of an electrowinning device interpreted according to the present invention.

In reference to FIG. 1 of the electrowinning device, the cathode comprises a plate (1) that totally covers the central opening and is the active surface of the cathode, which is the space (2) through whose frame (3) the catholyte circulates.

Adjacent to this frame (3) is the frame (4), which is arranged in line on a plane parallel to that of the plate (1). Inside this frame (4), in the space corresponding to the central opening (2), it contains an ion exchange membrane (5), which is supported on both sides by grates (6) and prevents the transfer of fluid from the circulation space of the anolyte corresponding to the frame (7), open space (2) totally covered by the active surface of the electrode wall (8) in contact with the anolyte acting as an anode that seals the opening through which the anolyte flows. The opposite wall of the electrode is covered with an insulating rubber piece (21) that separates it from the cathode (1), allowing the reconfiguration of the electrowinning device in the same way as explained before, to configure two identical chambers and the electrowinning device made up of equivalent chambers according to the present invention.

The frames (3), (4) and (7) have eight openings (9), (10), (11), (12), (13), (14), (15) and (16) which in the electrowinning device, along its length, form an internally connected whole, connected to the headers through which the electrolyte is loaded into the catholyte circuit, and liquor is loaded into the anolyte circuit, which flow to the cathode and anode compartments, respectively, filling each chamber of the electrowinning device with fluid. The anolyte compartments are entered through the lateral openings (12) and (13), while the product of the electrolysis is extracted through the lateral openings (9) and (15). Similarly, and in the same way and in parallel, the catholyte fluid enters through the openings (14) and (16) and is extracted through the openings (10) and (11). The cathode plate (1) and anode plate (8) are constructed such that they do not interfere with the circulation flows of the intake and outlet liquors in and out of the device and in the case of the ends of the electrowinning device, both electrodes (1) and (8) have openings for the connection to electrical energy. As a product of the electrolysis, metal is generated and deposited on the cathodes (1) of the device. At the end of the production cycle, when the expected thickness of metal on the cathode (1) and a minimum concentration of metal dissolved in the electrolyte have been achieved, the device is opened and the cathodes are lifted out and extracted. They are then replaced to start a new production cycle. In the cases that require it, the metal can be removed by simply allowing it to fall directly to the base of the device for collection and transport. The common guide (17) of the frames, secures them to a rail and their pressing, when applicable, is the equivalent of a filter press. This way, the guide (17) allows the movement of the frames (3), (4) and (7) in the enclosure and the opening of the electrowinning device, according to the invention.

The space between the surface of the cathode (1) and the surface of the ion exchange membrane (5), and between these and the surface of the anode (8) varies between 1-50 mm, while the feed rate of the electrolytic solution varies between 1-2000 l/min. The electrolytic device is constructed of PVC, PP, or another plastic material resistant to acidic, basic, or neutral and electrically neutral solutions.

Figure 2:
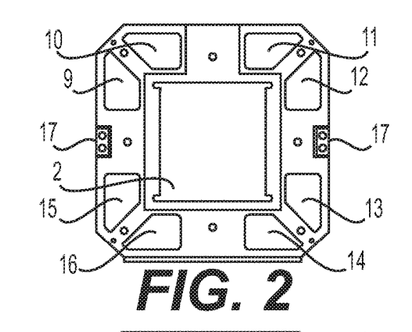
FIGS. 2, 3 and 4 are cross-section views of a chamber frame of the electrowinning device comprising the electrolyte circulation openings and the assembly condition elements according to the present invention.
Figure 3:
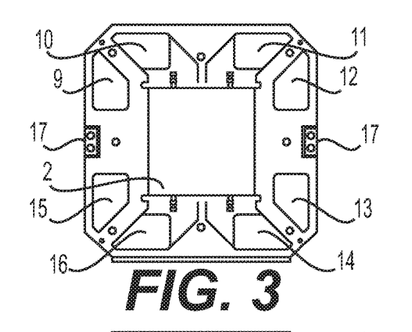
Figure 4:
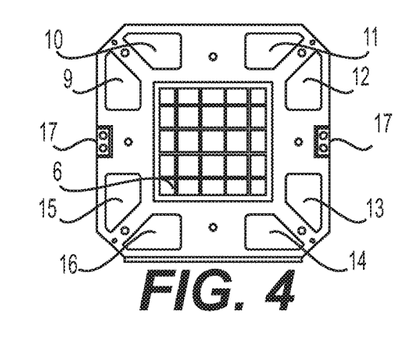

In reference to FIGS. 2, 3 and 4, these correspond to the cross-section deployment of the frame (3) in FIG. 1. In terms of construction and easy assembly of the present patent, it is possible to create the hydrodynamic flow of least resistance to the circulation of the electrolyte or liquor through the openings (9), (10), (11), (12), (13), (14), (15) and (16) with other cross-section views to the compartments of the respective chambers of the cell. Also, the openings (9), (10), (11), (12), (13), (14), (15) and (16) can be formed independently in the upper as well as the lower part, not allowing communication between the catholyte and anolyte. The guide (17) aligns the frame (3) with the other frames (4) and (7), and the others that are installed successively to form one or multiple electrowinning devices according to the invention.

Figure 5:
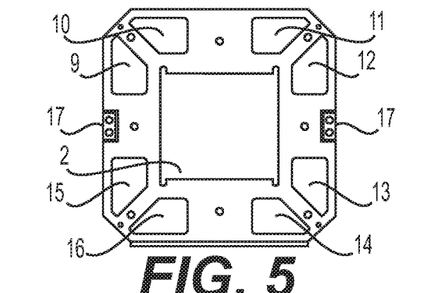
FIGS. 5, 6, 7, 8, 9 and 10 are cross-section views of a chamber frame comprising its front and rear view, and the support structure grate of the ion exchange membrane according to the invention.
Figure 6:
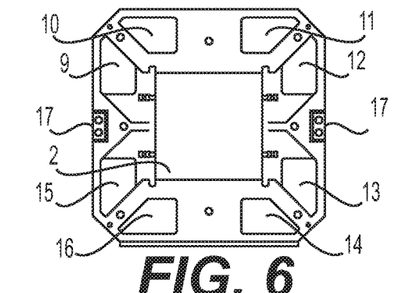
Figure 7:
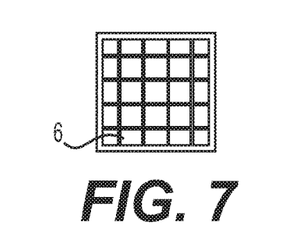
Figure 8:
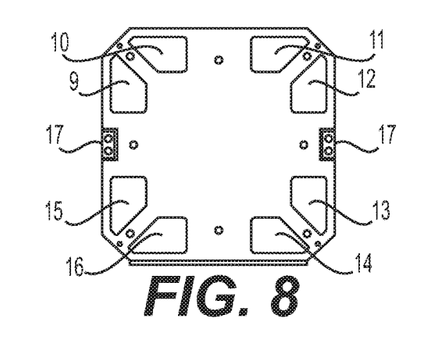
Figure 9:
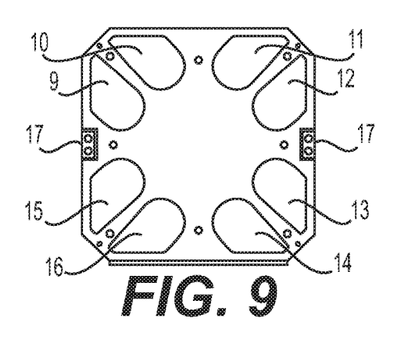
Figure 10:
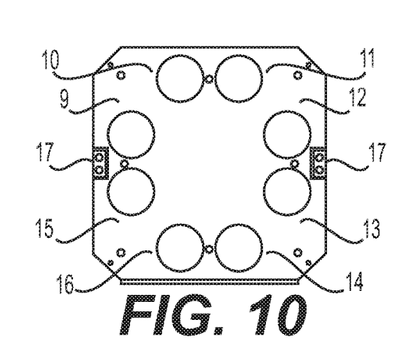

In regard to FIGS. 5, 6, 7, 8, 9 and 10, these are cross-section views of the standard frame (4) corresponding to the pieces that make up its parts for easy assembly and construction wherein FIG. 5 is the front side of the first section and FIG. 6 is the back side of the first section. Each slot or opening of a surface has its correspondence on the other surface, (10), (11), (14) and (16). Similarly, in FIGS. 7 and 8 which make up the second section, each projected part has its correspondence on each side of the surface, (9), (15), (12) and (13). From the point of view of the stress on the frame, this form of construction is preferable because of its easy construction and assembly, and because it keeps the opening (2) constant in the electrolytic compartment. The inside of the frame (4) contains the ion exchange membrane which, due to its flexibility and long estimated period of use, must be stiffened, because it separates the catholyte and anolyte compartments. FIG. 9 shows the support grate (6) that is shown in FIG. 10, and it is structured and formed of squares, constructed of the same material as the device, which gives it a high degree of strength and allows for easy installation.

Figures 11, 12:
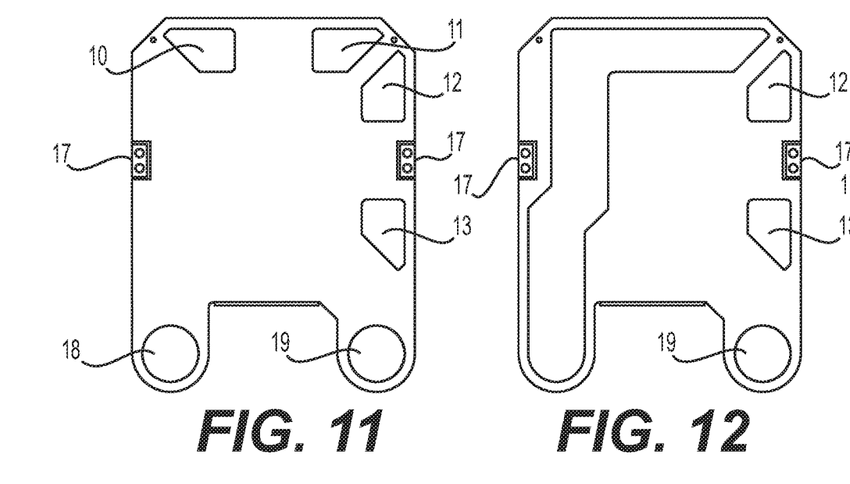
FIGS. 11, 12, 13, 14 and 15 are cross-section views of the terminal frame of the electrowinning device.
Figure 13:
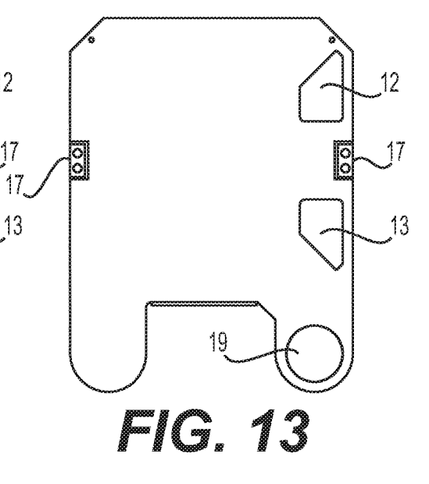
Figure 14:
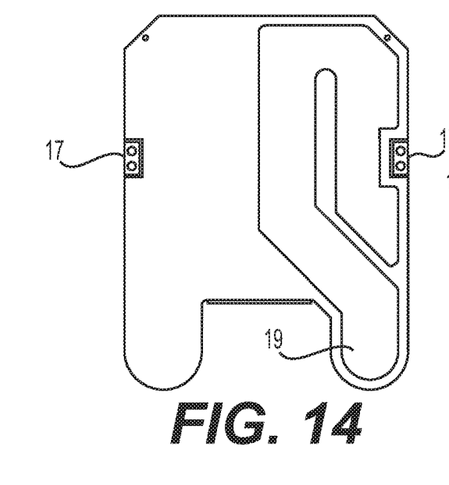
Figure 15:
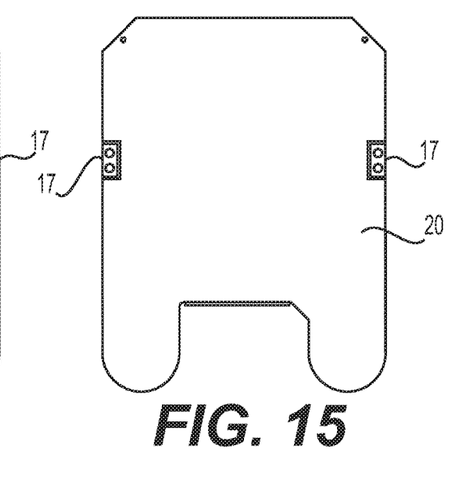

In reference to FIGS. 11, 12, 13, 14 and 15, these correspond to the terminal frame of the electrowinning device, showing the hydrodynamic sections for carrying the fluids in the device, for both easy construction and installation. In the first cross-section, FIG. 11, the active intake conduit openings (10) and (11), which correspondingly have their outlet at the opening (18), as shown in the cross-section in FIG. 12. Similarly, the active intake conduit openings (12) and (13), have their outlet (19) as shown in FIG. 11. They then continue through FIGS. 13 and 14. FIG. 15 is the sealing cover (20) of the electrowinning device according to the invention.

Figure 16:
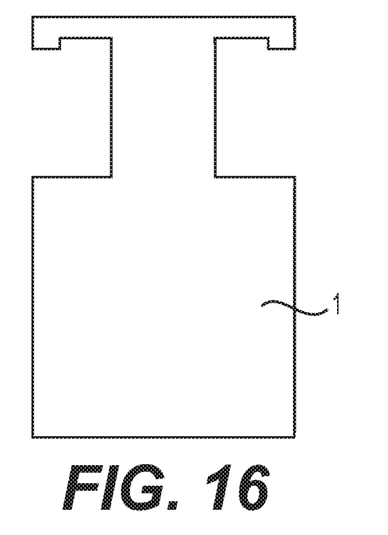
FIG. 16 is a cross-section view of the electrode of the electrowinning device, in its configuration as a cathode.

In reference to FIG. 16, the cathode (1), typically made of stainless steel, titanium, iron alloys, or another suitable material for the catholyte compartment according to the present invention.

Figure 17:
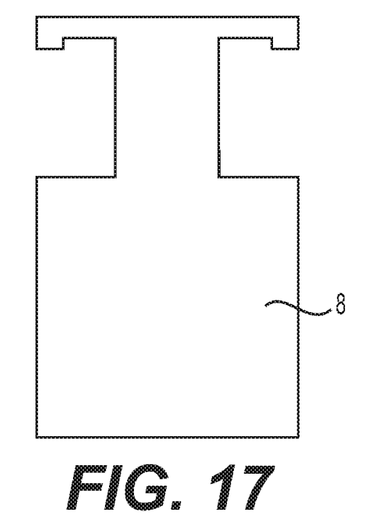
FIG. 17 is a cross-section view of the electrode of the electrowinning device, in its configuration as an anode.

In reference to FIG. 17, the anode (8), typically made of lead, tin, calcium, or another required material depending on the anolyte liquor according to the present invention.

Figure 18:
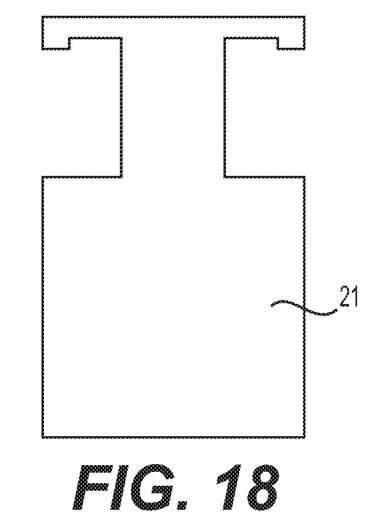
FIG. 18 is a cross-section view of the rubber sheet of the electrowinning device, in its configuration as an insulator and separator of the anode and cathode electrodes.

In reference to FIG. 18, the rubber sheet (21) typically Eva rubber, India rubber, or another suitable material to insulate and separate the anode (8) and cathode (1) electrodes in the electrowinning device according to the invention.

EXEMPLARY EMBODIMENTS

The following sections will describe the present invention in greater detail in regard to several working examples, which nevertheless shall not limit the scope of the invention.

Electrolytic copper was produced using the electrowinning device described in the present invention FIG. 1. The filter press metal electrowinning device was assembled according to the description in the present invention, with a size in reference to what is industrially required to obtain copper ¼ $m^2$, and that define the examples that are described:

1. In the corresponding frames, position a flat cathode (1) and a flat anode electrode (8), made of stainless steel in the case of the cathode and lead in the case of the anode, respectively, measuring 250 mm×250 mm each, with the cathode and anode arranged face to face.

2. Both electrodes separated by an ion exchange membrane, with a pass-through thickness defined for circulation of the catholyte that is from the cathode to the membrane, of 40 mm; and for the circulation of the anolyte, that is from the anode to the membrane, of 10 mm.

3. The pressure required for rapid assembly of the elements varied between 3-5 kg/cm$^2$, with this pressure applied by the press until there were no signs of leaks of the solution from the device.

4. The electrolytic solutions are carried to the electrowinning device through plastic pipes, as is also the case of the storage tanks and receivers of the circulating liquid.

5. The anolyte solution circulates through the compartments and ducts arranged for this purpose, according to the invention at 600 l/min, while the catholyte solution circulates through its respective compartments also at 600 l/min.

6. In usage, a DC (direct current) electrical power supply is connected to the electrowinning device with its positive terminal connected to the electrode (8) that is the anode, and its negative terminal to the cathode (1) metal, preferably with easy to install clip-on connectors.

With the application of direct current between the cathode and the anode and the acidified copper sulfate solution, 99.99% Cu electrolytic copper was obtained under the conditions indicated in Table I.

TABLE I

Operational data EW filter press device

| | Example No. | |
|---|---|---|
| | 1 | 2 |
| Concentration Cu (g/l) | 5 | 5 |
| Electrolyte flow (l/min) | 600 | 600 |
| Cell voltage (V) | 12.8 | 12.0 |
| Catholyte temperature (° C.) | 42.5 | 41.0 |
| Catholyte pH | 1.46 | 1.34 |
| Current density (A/m$^2$) | 192 | 192 |
| Operation time (h) | 8 | 24 |
| Cathode weight (3) (g) | 292.8 | 853.7 |
| Efficiency (%) | 97 | 96 |

The invention claimed is:

1. A filter press device for the electrodeposition of metal from solutions, wherein the filter press device is a completely closed and pressure sealed device with no emission of gases under controlled pressure, flow, amperage, voltage, pH, and temperature, the filter press device consists of:
chamber units independently formed by a series of plates made of an electrically insulating material,
electrodes, and
ion exchange membranes placed between each anode and cathode to form a plurality of anode and cathode compartments, wherein the ion exchange membranes prevent passage of solvent,
wherein each one of the plates of insulating material contains a series of openings from which electrolytes and liquors from metallurgical operations are loaded into the anode and cathode compartments at room temperature and at uniform flow rates, residence times and amperage,
wherein each of the plurality of anode and cathode compartments comprises independent communication openings for movement of catholyte or anolyte, the communication openings are arranged along a length of an electrowinning device in parallel and/or series, at the same time allowing an incorporation and movement of fluids inside each compartment from one end to an other end, from a lower part to an upper part, from the upper part to the lower part, from left to right, or vice-versa, and from opposite positions to their incorporation, spent liquors are removed,
wherein, once a production cycle is concluded, a cell is stopped by opening thereof, metal deposition cathodes are raised, removed, and replaced to start a new production cycle, or the metal deposition cathodes remain in place without being removed from the filter press device and electrodeposited product is detached.

2. The filter press device for the electrodeposition of metal from solutions according to claim 1, wherein, in industrial production, a plurality of filter press devices for the electrodeposition of metal are electrically connected in series, wherein all of the electrodes, except terminal electrodes are bipolar, and are equipped with a vertical plate base separated by a rubber piece, and
wherein one side acts as an anode in a cell unit, an other side acts as a cathode in an adjacent chamber unit.

3. The filter press device for the electrodeposition of metal from solutions according to claim 1, wherein the device is made up of chamber units that operate hydraulically in parallel or in series, at flow rates between 1 and 100,000 l/min.

4. The filter press device for the electrodeposition of metal from solutions according to claim 1, wherein all of the electrodes are designed with a vertical base plate, with a single compact body of metal plates of different nature if they are cathodes or anodes connected in series in which terminal electrodes have electrical connections for a row of devices.

5. The filter press device for the electrodeposition of metal from solutions according to claim 1, wherein the metal cathode with the product of the electrolysis is removed in cyclical production periods dependent of a concentration of metal dissolved in the catholyte without cathode extraction with detachment in the device due to low surface roughness.

6. The filter press device for the electrodeposition of metal from solutions according to claim 1, wherein metal support cathode does not suffer corrosion due to pitting in the metal.

7. The filter press device for the electrodeposition of metal from solutions according to claim 1, wherein, in a terminal plate made of a seal insulating material of the device, there are at least a pair of openings which together form a compartment of the cell, and serve as a hydraulic compensation collector for the catholyte and anolyte fluids, respectively.

8. The filter press device for the electrodeposition of metal from solutions according to claim 1, wherein the plates of electrically insulating material have thicknesses that range between 1 to 100 mm.

9. The filter press device for the electrodeposition of metal from solutions according to claim 1, wherein the cathode plates are made of stainless steel, titanium, or another steel alloy, and the anode plates are made of lead alloy, lead, or titanium or another metal, and thicknesses of the anode plates and the cathode plates range between 1 to 5 mm.

10. The filter press device for the electrodeposition of metal from solutions according to claim 1, wherein an area of the ion exchange membrane separating the catholyte and the anolyte is approximately equivalent to a metal deposition area, being encapsulated between meshes of electrically insulating material.

11. The filter press device for the electrodeposition of metal from solutions according to claim 1, wherein an area of the device is defined according to an area of metal to be deposited on the cathode, a variable surface area that is designed according to industrial requirements: 0.10-2 m².

12. The filter press device for the electrodeposition of metal from solutions according to claim 1, wherein a current supplied to the device allows current densities between 50-2000 A/m² to be achieved.

13. The filter press device for the electrodeposition of metal from solutions according to claim 1, wherein the temperature of the catholyte and anolyte solutions ranges between 10-60° C.

14. The filter press device for the electrodeposition of metal from solutions according to claim 1, wherein the device can be applied to any liquor or solution containing dissolved metals, comprising copper, zinc, gold, silver, cadmium, nickel, cobalt, uranium, iron, with contents ranging between 0.5 to 50 g/l.

15. The filter press device for the electrodeposition of metal from solutions according to claim 1, wherein the device reduces times of chemical reactions and residence of the electrolytic solutions in the device, leading to homogeneous electrodepositions, which makes it possible to select size of the material to be deposited and thickness of the metal plate.

* * * * *